United States Patent [19]

Cornelissen

[11] Patent Number: 4,941,977

[45] Date of Patent: Jul. 17, 1990

[54] CROSS-FLOW SEPARATOR FOR SEPARATING COMPONENT SUSPENDED IN A LIQUID

[75] Inventor: Jan Cornelissen, Den Haag, Netherlands

[73] Assignee: Pielkenrood Vinitex B.V., Assendelft, Netherlands

[21] Appl. No.: 538

[22] Filed: Jan. 5, 1987

[30] Foreign Application Priority Data

Jan. 9, 1986 [NL] Netherlands .................. 8600032

[51] Int. Cl.⁵ ..................................... B01D 21/10
[52] U.S. Cl. .................................... 210/521; 210/802
[58] Field of Search ................... 210/521, 522, 802

[56] References Cited

U.S. PATENT DOCUMENTS

| | | | |
|---|---|---|---|
| 3,837,501 | 9/1974 | Pielkenrood | 210/522 |
| 3,915,858 | 10/1975 | condolios | 210/521 |
| 4,194,976 | 3/1980 | Robinsky | 210/521 |
| 4,400,280 | 8/1983 | Larsson et al. | 210/521 |

FOREIGN PATENT DOCUMENTS

| | | | |
|---|---|---|---|
| 364491 | 11/1962 | Switzerland | 210/521 |
| 586130 | 12/1977 | U.S.S.R. | 210/522 |

Primary Examiner—W. Gary Jones
Assistant Examiner—Coreen Y. Lee
Attorney, Agent, or Firm—Beehler, Pavitt, Siegemund, Jagger, Martella & Dawes

[57] ABSTRACT

A cross flow plate separator of the type having an assembly of parallel plates inclined to the horizontal plane in a container between a supply chamber and a discharge chamber, and at least one collecting chamber above or below the plate assembly for collecting components separated from liquid flowing between the plates from the supply to the discharge chambers, and wherein transverse dividing baffles extend the collecting chambers to a depth below a collected sediment layer or into a floating layer as the case may be, is improved by provision of auxiliary transverse baffles in the collecting chamber between the larger dividing baffles, the auxiliary baffles each having one edge in contact with the plate assembly and extending into said collecting chamber a distance substantially short of either sediment or floating layers, to suppress liquid flow exterior to the plate assembly between the dividing baffles. Further improvement includes providing flow smoothing upstream edges and debris retaining lips on the downstream edges of the separator plates.

4 Claims, 1 Drawing Sheet

CROSS-FLOW SEPARATOR FOR SEPARATING COMPONENT SUSPENDED IN A LIQUID

BACKGROUND OF THE INVENTION

1. Field of the Invention

Plate separators are known in which a liquid flow is led through the interspaces of an assembly of parallel plates, in order to reduce the separation path of said components. Said plates are arranged at such an inclination that the separated components will slide along said plates, and will be discharged in an adjoining collecting chamber.

In a special construction thereof, the so-called cross-flow separator, the liquid to be treated is introduced transversely to the direction of largest inclination of the plates through said interspaces, so that the separated components will move transversely to the liquid flow towards the collecting chamber in question, which is situated, for the heavier components, at the lower side, and, for the lighter components, at the higher side of the plate assembly.

2. State of the Prior Art

A difficulty with such cross-flow separators is that the liquid will escape for a substantial part outside the plate assembly through the adjoining collecting chamber or chambers, since the flow resistance in the interspaces between the plates is higher, in particular when corrugated plates are used.

According to NL-A 70 01 713 the latter is avoided by arranging transverse baffles in the collecting chambers suppressing such short-circuit flows, said baffles extending, in particular, into the layer of sedimentating components in the lower collecting chamber, or above the layer of floating components in the upper collecting chamber.

If the number of such transverse baffles is relatively small, it cannot be avoided that, nevertheless, short-circuit flows will escape between said baffles outside the plate assembly, which prevents that the optimal separation effect will be obtained. Moreover the lower collecting chamber is, generally, conically shaped in order to guide the collected sediment towards a discharge duct, so that the assembly of baffles should be made fan-shaped, the baffles at the lower side of said chamber being arranged closely together. Thereby the number of baffles is substantially restricted, since said distance cannot be made too small.

SUMMARY OF THE INVENTION

The invention provides an improvment of such a separator, which is characterised in that, between the transverse baffles, auxiliary baffles are provided extending over a smaller distance, said baffles being adapted to suppress short-circuit flows beyond the plate assembly between the transverse baffles arranged at the larger mutual distance.

In this manner the short-circuit flow can be suppressed by means of a smaller number of transverse baffles, and the intermediate shorter auxiliary baffles between said transverse baffles will suppress short-circuit flows at a smaller depth. Said auxiliary baffles then will have the effect that the velocity of short-circuit flows, which might flow below said auxiliary baffles through the chamber in question, will be so low that a sufficient separation of entrained components therefrom can take place, so that said residual flows will not detract from the separation effect of the separator.

Since, now, a relatively small number of longer transverse baffles can be used, supporting said baffles is simplified, and, at a fan-shaped arrangement thereof, the distance therebetween at the narrower side will not become too small. Said auxiliary baffles have substantially smaller transverse dimensions, and are, therefore, lighter.

Such auxiliary baffles can, in particular, consist of a grid of mutually parallel strips.

Said auxiliary baffles can also have alternately opposite inclinations, this in such a manner that always two auxiliary baffles or an auxiliary baffle and an adjacent wall or transverse baffle form a funnel having the narrowest opening at the side remote from the plate assembly, and the edges of any two auxiliary baffles joining the plates being contiguous. Also these baffles will give rise to a substantial reduction of the velocity of remaining short-circuit flows. If required, auxiliary baffles of the first-mentioned kind can be arranged between such auxiliary baffles.

Such auxiliary baffles, and in particular auxiliary baffles assembled to a grid, form, moreover, an effective means for supporting the plates of the plate assembly.

If planar plates are used, it is preferred, in order to prevent components discharged along said plates towards the discharge chamber from being entrained by the liquid, to provide said plates at the side of the liquid discharge with an upstanding rim extending from the plate in question at that side where the predominant separated component is collected, in order to prevent that at that side component residues will be entrained by the liquid. Instead of an upstanding rim also a relatively shallow gutter can be provided at the extremity of the plate, in particular if lighter as well as heavier components are separated, and then a smaller reduction of the liquid passage cross-section will occur than in the case of upstanding rims extending in both directions.

Furthermore it is advisable to provide, at the liquid discharge side of said plates, a curled rim forming a smooth flow guide for the liquid flowing inwards.

Particularly in the case of such separators in which the plate assembly is divided in at least juxtaposed subassemblies, e.g. in the case of separators to be arranged in a tank, when the elements thereof are to be introduced through a man-hole, such planar plates with an upstanding or curled rim respectively have the advantage that the upstanding rims of one set will join the curled rims of an adjacent set, so that small differences in the relative position of the plates will not have an influence on the liquid flow through said assembly.

BRIEF DESCRIPTION OF THE DRAWINGS

The invention will be elucidated below by reference to a drawing, showing in.

DETAILED DESCRIPTION OF THE PREFERRED EMBODIMENTS

Figures 1, 2:
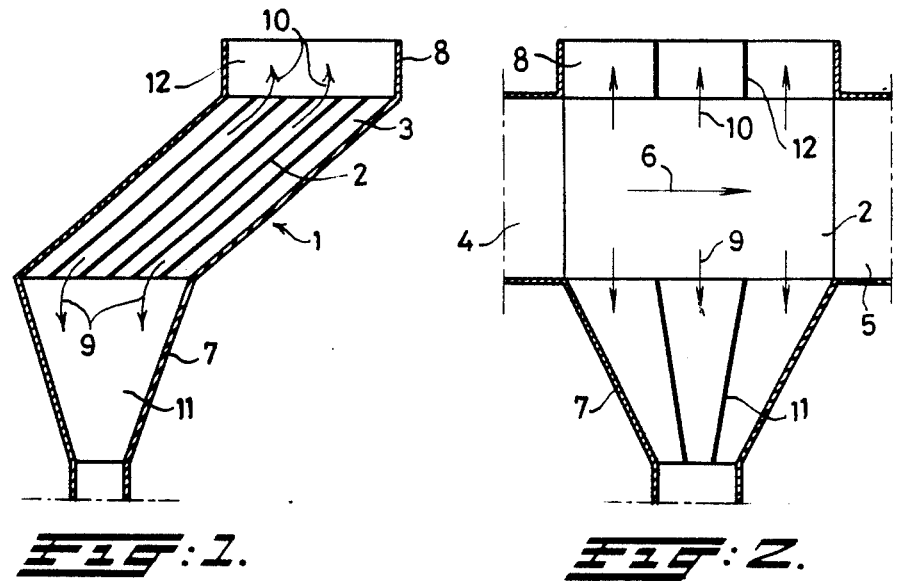
FIGS. 1 and 2 a longitudinal and transversal section respectively of a known cross-flow separator.

In FIGS. 1 and 2 a current cross-flow separator is diagrammatically shown in two different sections. Said separator comprises an enclosure or tank 1, within which an assembly of mutually parallel plates 2 is arranged at an angle, between which plates 2 separation passages 3 are situated.

At one side of this assembly 2 a supply chamber 4 for the liquid to be treated, and at the other side a discharge chamber 5 for the treated liquid are present, this in such a manner that the liquid will flow substantially horizontally through the passages 3, as indicated by an arrow 6.

At the lower and upper sides of said assembly 2, collecting chambers 7 and 8 resp. for sedimentating and flotating components resp., separated in the passages 3, are arranged, said components flowing transversely to the liquid flow 6 along the plates 2 as indicated by arrows 9 and 10 resp. If only sedimentating or flotating components are present, the other chamber can be left out of course.

Since, because of the friction against the plates 2 defining the passages 3, the flow resistance therein will be higher than outside said passages, a part of the liquid will flow around the assembly 2 through the chambers 4 and 5. These short-circuit flows will, then, not be submitted to the favourable separation conditions within the passages 3, so that the separation effect will deteriorate accordingly, which is still worsened because said short-circuit flows can entrain separated components collected in the chamber 7 or 8 in question towards the discharge chamber 5.

In order to be able to suppress such short-circuit flows, in the chambers 7 and 8 transverse baffles 11 and 12 resp. are arranged, which join the edges of the plates 2. Said baffles 11 extend so far into the chamber 7 that, during the normal operation, said baffles extend into the sediment layer present therein, so that the passages for the short-circuit flows are blocked.

The chamber 7 should, as shown, be cone-shaped for removing the sediment. The transverse baffles 11 should, therefore, be arranged fan-shaped, which, because of the fact that, at the lower side, a sufficient passage should remain free, will lead to a restriction of the number of baffles 11. Therefore one will try to keep the number of transverse baffles 11 and 12 as small as possible.

If, however, the distance between the baffles 11 or 12 becomes too large, in the region between two adjacent baffles short-circuit flows can arise again, which, though extending less far into the chamber 7 or 8 in question, will still substantially detract from the separation effect. In practice a baffle distance of 100 mm is necessary for effectively suppressing such short-circuit flows, which is very objectionable.

Figures 3, 4:
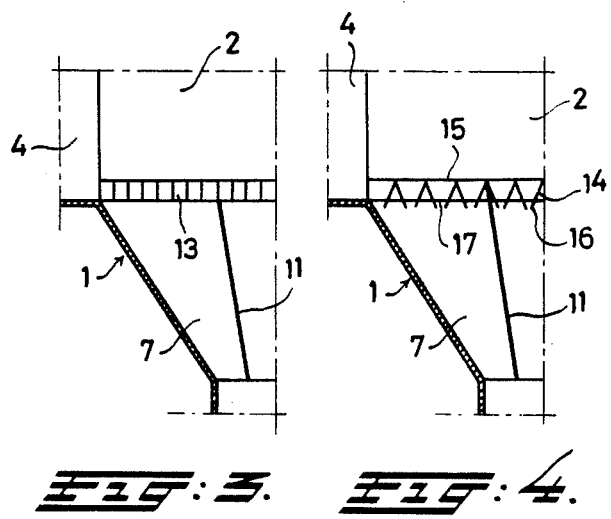
FIGS. 3 and 4 partial sections of two different embodiments of a cross-flow separator according to the invention.

FIG. 3 shows a first embodiment of an improved cross-flow separator according to the invention, in which the distance beteen the transverse baffles 11 and 12 can be made substantially larger. For the sake of simplicity only the portion near the lower collecting chamber 7 is shown. The upper chamber 8 can be constructed in a similar way.

Between the transverse baffles 11 auxiliary baffles 13 with a smaller height are now arranged, which uniformly reduce the distance between two adjacent transverse baffles 11 (or between a wall of the container 1 and a baffle 11). Said auxiliary baffles engage again the edges of the plates 2. The height of said auxiliary baffles 13 is sufficient for substantially suppressing short-circuit flows, and the velocity of liquid still flowing below said auxiliary baffles is reduced to such an extent that components entrained therein will be separated in the chamber 7.

In particular said auxiliary baffles 13 can be a part of a grid having a sufficient bending strength for supporting the plate assembly 2, so that supporting said plates is simplified thereby.

Since said auxiliary baffles have a relatively small height, they can be arranged substantially parallel in respect of one another as shown, and the flow resistance for the separated component is not substantially increased.

FIG. 4 shows a second embodiment, in which, between the transverse baffles 11 (or 12), auxiliary baffles 14 are provided which have an alternating inclination, and the edges 15 of adjacent auxiliary baffles contact one another as well as the plates 2, the other edges 16 defining, together with the edges 16 of adjacent baffles 14 (or the lateral walls of the container 1 or a transverse baffle 11 or 12) a passage 17. Also in this case a substantial suppression of short-circuit flows will take place, and the velocity of the remaining flows will be considerably reduced.

If necessary the auxiliary baffles 13 of FIG. 3 can be arranged between the auxiliary baffles 14 of FIG. 4. This will, for example, be done if the baffles 14 are arranged at a relatively large distance.

The embodiment of FIG. 4 will, in particular, be used in collecting chambers 7 for sedimentating components. In the flotation chambers 8, generally the auxiliary baffles of FIG. 3 will be sufficient.

It is often favourable to use planar plates 2.

Plates have, however, a low bending resistance, so that a good support thereof is necessary. The auxiliary baffles of FIGS. 3 and 4 provide such a support at the extremities, and, if required, stiffening rods extending in the direction of the largest inclination of the plates can be provided for improving the support.

FIG. 5A shows a planar plate 2 which, at the side directed towards the supply chamber 4, is provided with a curled rim 18 bringing about a longitudinal stiffening of the plate, and which, moreover, provides a flow profile which can favourably influence the inflow of the liquid, and, in particular, a uniform flow distribution over the whole passage 3. At the other side of the plate 2 an upstanding rim 19 is provided, which, in the case shown, is directed upwards. In the case of sedimentating components sliding along the plate 2 towards the collecting chamber 7, there is a possibility that, in particular at the lower side of the plate, a part of the sediment will be entrained towards the discharge chamber 5. The upstanding rim 19, providing a marginal stiffening, prevents such entraining. In the case of substantially flotating components, the rims 19 will be directed downwards.

In the case of both flotating and sedimentating components, a rim 19 etending in both directions can be provided, but this can have the consequence that the cross-section of the passages 3 becomes too small. FIG. 5B shows another embodiment in which, instead of the upstanding rim 19, a gutter 20 is used which, in the case shown, collects sedimentating components, and the downwardly directed flange thereof stops flotating components against the lower side of the plate 2. Of course said gutter can also be oppositely directed.

Figure 5:
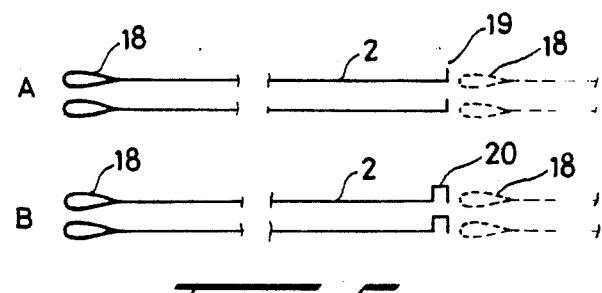
FIGS. 5A and B partial sections of a special construction of planar plates for a plate assembly according to the invention.

The edges 18 and 19 have also an additional advantage, if a plate assembly is to be composed from subassemblies. This is, for instance, the case with a plate separator to be arranged inside a pressure tank, when the elements thereof are to be introduced through a manhole, so that subassemblies of smaller dimensions should be used, which, then, are to be juxtaposed and superposed. At the subassemblies to be juxtaposed, the rim 18 of one subassembly join the rims 19 of the adjacent subassembly, as indicated in FIG. 5 by interrupted lines, so that small differences in height between said adjacent subassemblies will not give rise to leak flows.

I claim:

1. In a cross flow plate separator of the type having an assembly of parallel plates inclined to the horizontal plane in a container between a supply chamber and a discharge chamber, and at least one collecting chamber above or below said assembly for collecting components separated from liquid flowing between said plates from said supply to said discharge chambers, and wherein a plurality of dividing baffles transverse to said flow extend in said at least one collecting chambers to a depth below a sediment layer collected beneath said assembly or into a floating layer in a collecting chamber above said assembly, the improvement comprising:

said plates having supply side edges curled (18) for smoothing said liquid flow entering between said plates from said supply chamber.

2. The improvement of claim 1 wherein said plates are planar plates having discharge side edges bent to form an upstanding lip (19, 20) extending towards the side of the plate along which the major component is separated from said flow thereby to suppress entrainment of said separated component into said discharge chamber with said flow.

3. The improvement of claim 2 wherein each said lip is part of a gutter (20) formed on said plate discharge side edge.

4. The improvement of claim 2 wherein said plate assembly is comprised of a plurality of subassemblies juxtaposed along the direction of said flow, said curled rims (18) of one said subassembly being aligned with a corresponding one of said lips (19, 20) of the adjacent subassembly.

* * * * *